US007001866B2

(12) United States Patent
Wang et al.

(10) Patent No.: US 7,001,866 B2
(45) Date of Patent: Feb. 21, 2006

(54) MODIFICATION OF THE PORE STRUCTURE OF METAL OXIDE AND MIXED METAL OXIDE SUPPORTS FOR CATALYSTS SYNTHESIS

(75) Inventors: Daxiang Wang, Ponca City, OK (US); Shuibo Xie, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 78 days.

(21) Appl. No.: 10/293,825

(22) Filed: Nov. 13, 2002

(65) Prior Publication Data
US 2004/0092392 A1    May 13, 2004

(51) Int. Cl.
*B01J 21/08*     (2006.01)
*B01J 21/12*     (2006.01)

(52) U.S. Cl. ............... 502/242; 502/263; 502/302; 502/303; 502/304; 502/325; 502/333; 502/334; 502/340; 502/341; 502/349; 502/355

(58) Field of Classification Search ........... 423/593; 502/333, 334, 0 R, 242, 263, 302–304, 325, 502/340, 341, 349, 355
See application file for complete search history.

(56) References Cited

U.S. PATENT DOCUMENTS

| | | | | |
|---|---|---|---|---|
| 3,236,662 A * | 2/1966 | Macdowell | .................... | 501/6 |
| 3,881,944 A | 5/1975 | Beall et al. | ................ | 106/39.7 |
| 4,545,797 A | 10/1985 | Elattar | ........................... | 65/19 |
| 4,601,997 A | 7/1986 | Speronello | ................... | 502/263 |
| 4,836,913 A | 6/1989 | Lussier et al. | .............. | 208/120 |
| 4,844,837 A * | 7/1989 | Heck et al. | ................. | 252/373 |
| 5,302,773 A * | 4/1994 | Vrieland et al. | ............ | 585/624 |
| 5,486,313 A * | 1/1996 | De Jong et al. | ............ | 252/373 |
| 5,952,259 A | 9/1999 | Drake et al. | .................. | 502/85 |
| 6,284,207 B1 | 9/2001 | McCauley | ................. | 423/132 |
| 6,340,437 B1 * | 1/2002 | Yagi et al. | ................... | 252/373 |
| 6,352,955 B1 * | 3/2002 | Golden | ....................... | 502/302 |
| 6,372,686 B1 * | 4/2002 | Golden | ....................... | 502/302 |
| 6,395,552 B1 * | 5/2002 | Borade et al. | ................ | 436/37 |
| 6,514,902 B1 * | 2/2003 | Inoue et al. | ................ | 502/305 |
| 2002/0115730 A1 * | 8/2002 | Allison et al. | ............. | 518/703 |
| 2002/0172642 A1 * | 11/2002 | Dindi et al. | ................ | 423/651 |

FOREIGN PATENT DOCUMENTS

WO    WO 00/12209    9/2000

OTHER PUBLICATIONS

European Search Report for Application No. EP 03 25 6823 dated Mar. 16, 2004 (2 p.).

* cited by examiner

*Primary Examiner*—Steven Bos
(74) *Attorney, Agent, or Firm*—Conley Rose P.C.

(57) ABSTRACT

A porous catalyst support having an increased average pore size is produced from a mixed metal oxide material. In accordance with one embodiment, a method for preparing a mixed metal oxide material includes providing a mixed metal oxide precursor containing at least two metals, calcining the mixed metal oxide precursor at a temperature sufficient to form a thermally and mechanically stable mixed metal oxide material, and leaching the mixed metal oxide material in a leach solution with a constituent that dissolves one metal oxide. Preferably, the calcination temperature is approximately between 300° C. and 1300° C. The leaching constituent may be chosen from the group including acidic solutions of HCl, $HNO_3$, $H_2SO_4$, $H_3PO_3$, and their combinations, or basic solutions of $NH_3$, NaOH, KOH, and their combinations.

16 Claims, 2 Drawing Sheets

MODIFICATION OF THE PORE STRUCTURE OF METAL OXIDE AND MIXED METAL OXIDE SUPPORTS FOR CATALYSTS SYNTHESIS

FIELD OF THE INVENTION

The present invention generally relates to a method for controlling the porosity of a catalyst support. More particularly, the invention relates to a method for producing a support with an increased average pore size from a mixed metal oxide material. Still more particularly, the invention relates to a catalyst that is active for catalytically converting light hydrocarbons (e.g., natural gas) to synthesis gas.

BACKGROUND OF THE INVENTION

In many heterogeneous catalytic reactions, especially those carried out at high temperature and high reaction rate such as selective oxidation reaction for syngas production, diffusion of reactants and/or products in the catalyst pores may affect the efficiency of catalyst material. Consequently, use of supports with small internal pores leads to inefficient use of catalyst because (i) the reactants do not have enough time to reach catalytic metals in the pores and (ii) the reactants may become trapped in the pores and interact in undesired secondary reactions during the diffusion of CO and $H_2$ from the pores.

Accordingly, there is a continuing need for better, more economical processes and catalysts for the catalytic partial oxidation of hydrocarbons, particularly methane, or methane containing feeds, in which the catalyst retains a high level of activity and selectivity to carbon monoxide and hydrogen under conditions of high gas space velocity and elevated pressure.

Heterogeneous catalysts and or their supports are prepared with various methods, such as precipitation, with pore sizes rang from around 3–50 Å for zeolite catalysts to the order of micrometers for form and monolith catalysts. The pore sizes are often optimized to fit the application by adjusting the preparation procedure. For example, zeolite materials are generally synthesized through crystallization of silicon, aluminum, sodium, sodium hydroxide and an organic template (For details see Vaughan, D. E. W., The synthesis and manufacture of zeolites, Chem. Eng. Progr., 84(2), 25–31, 1988). The organic template, typically an organic amine or alkyl ammonium compound, works as molecular mold to generate the porous network. The template is then removed through oxidation.

Pore generation reagents, such as carbon, sulfur are used to increase the porosity of corresponding catalyst or its support. These reagents are mixed with the catalyst precursor and compressed to form the desired shape. Calcination of the shapes material to combust the carbon (e.g. graphite) or sulfur results in the formation of pores. Due to the low temperature of removing such reagent, the catalyst prepared in such a way typically do no have good thermal stability, due to the lack of high temperature treatment in its preparation.

In contrast to the prior art, this invention discloses a new method of using inorganic compound as template to prepare catalyst its support material with desired porosity and high thermal stability.

SUMMARY OF THE INVENTION

A method for controlling the pore structure of a catalyst support is disclosed. In accordance with a preferred embodiment of the present invention, a method for preparing a mixed metal oxide material with an increased average pore size includes providing a mixed metal oxide precursor containing at least two metals, calcining the mixed metal oxide precursor at a temperature sufficient to form a thermally and mechanically stable mixed metal oxide material, and leaching the mixed metal oxide material in a leach solution with a constituent that dissolves one metal oxide. Preferably, the calcination temperature is approximately between 300° C. and 1300° C. The leaching constituent may be chosen from the group including acidic solutions of HCl, $HNO_3$, $H_2SO_4$, $H_3PO_4$, and their combinations, or basic solutions of $NH_3$, NaOH, KOH, and their combinations.

These and other embodiments, features and advantages of the present invention will become apparent with reference to the following description.

BRIEF DESCRIPTION OF THE FIGURES

A better understanding of the present invention can be obtained when the following detailed description of the preferred embodiment is considered in conjunction with the following drawing.

DETAILED DESCRIPTION OF PREFERRED EMBODIMENTS

Figure 1A:
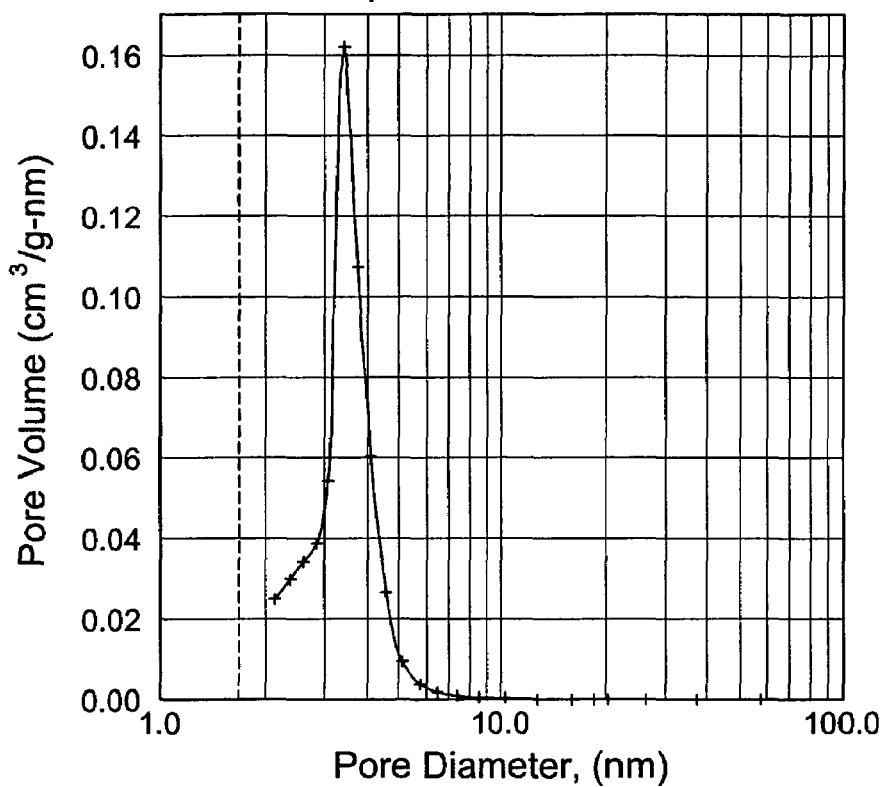
FIGS. 1(A)–(D) are plots illustrating the pore structure of the mixed oxide samples after various treatments, where (A) relates to sample 1A, (B) relates to sample 3B, (C) relates to sample 2A, and (D) relates to sample 3A.

The selection of a catalyst or catalyst system requires many technical and economic considerations. Key catalyst properties include high activity, high selectivity, high recycle capability and filterability. Catalyst performance is determined mainly by the active metal components. For example, a metal might be chosen based both on its ability to complete the desired reaction and its inability to complete an unwanted reaction. Additionally, a catalyst may also include a support and may take any desired shape, including monolithic, spherical, etc.

Metal oxides (i.e. alumina, zirconia, titania, silica, etc.) are often used as support materials in partial oxidation catalyst systems because they generally possess low thermal expansion coefficients, good mechanical strength and thermal stability at elevated temperatures. However, the other properties within the metal oxide group vary. For example, zirconia possesses excellent chemical inertness and corrosion resistance at temperatures well above the melting point of alumina. By taking advantage of the differences in properties within the metal oxide group (i.e. melting point, solubility, etc.) it is possible to create highly desirable composites, which may be manipulated to form porous materials.

The present invention includes a method for increasing the average pore size of a mixed metal oxide material using the following steps:

i) providing a mixed metal oxide precursor containing at least two metals, ii) calcining the mixed metal oxide precursor at temperatures sufficient to form a thermally and mechanically stable mixed metal oxide material; and iii) leaching the mixed metal oxide material in a leach solution with a constituent that dissolves one metal oxide.

The mixed metal oxide precursor may be prepared by numerous methods including precipitation (i.e. coprecipitation, stepwise precipitation) and/or mechanical mixing (i.e. milling, kneading). In addition, the leach solution may completely or partially dissolve one metal oxide.

Providing the Precursor

The mixed metal oxide precursor preferably comprises at least two metal oxides. Particularly suitable metal oxides are oxides of Group IIA, IIIA, VIIIB and rare earth metals.

(1) Precipitation

In precipitation, the precursors of the components for the support, often in their salt forms, are first dissolved in water or other suitable medium to form a homogenous solution. In a preferred embodiment, the metal oxide precursors have different solubilities. The solution is then subjected to pH adjustment or evaporation to force the salts to precipitate. The salts may be hydrolyzed into hydroxide forms or oxides. The concentration of salt, temperature, the actual pH value, and the rate of pH change all influence crystal growth and aggregation. Abrupt change of pH and high concentration of salt results in small particles and large aggregate. In some embodiments, ammonium hydroxide is used to increase pH value to avoid introduction of alkali metal in the final material.

The precipitated solid mass is then collected and dried gradually to about or greater than the boiling point of the medium. In a preferred embodiment, the temperature is raised slowly (i.e. 2° C. to 5° C. per minute), to allow the evaporation of water or solvent in the equilibrium state to help the component molecules redistribute to attain a more even distribution.

Because the dry mass obtained is in a loose state with an irregular shape, it is preferably ground to powder form. The powder may then be formed into a desired shape by a forming process and the use of suitable additives (i.e. binders, lubricants, etc.). A chosen binder is preferably one that can be burned into a volatile vapor of steam and carbon dioxide during calcination or activation. In extrusion or pelletization, a lubricant may be added to make the forming process smoother and faster. Alternatively, in some embodiments, the dry mass is calcined and leached prior to being ground into powder and formed into a desired shape.

(2) Mechanical Mixing

In mechanical mixing, the precursors of the components for the support are mechanically mixed (i.e. via kneading or milling) to form a uniform mixture. The resultant uniform mixture preferably comprises a fine powder formed from the precursors. In some embodiments, the addition of a liquid, such as water, is desirable. If a liquid is added, it is preferable to dry the mixture before shaping and calcination.

Calcination

Calcination is undertaken to convert the salt or hydroxide form of the active components into oxides by reacting metal salts with air at elevated temperature. During calcination, the materials also solidify into final form (i.e. amorphous→crystalline). As a result, the surface and mechanical properties are mainly determined in this step. Therefore, temperature increase is preferably slow (e.g. 2° C. to 5° C. per minute), to allow the component molecules to develop into a stable structure without strain.

As a guideline, the final temperature of calcination is preferably higher than the intended reaction temperature. Usually, about 50° C. higher than the reaction temperature is a good margin to ensure the thermal stability of the catalyst during the reaction. In a preferred embodiment, the calcination temperature is approximately between 300° C. and 1300° C.

Leaching

In a preferred embodiment of the present invention, following calcination, the mixed metal oxide material is packed into an ion-exchange column as slurry with deionized (DI) water. Once the column is sufficiently packed, a leaching constituent is used to leach out one metal oxide from the mixed metal oxide material at a predetermined rate. Alternatively, the mixed metal oxide material may be leached in a batch tank. Because the different metal oxides in the mixed metal oxide material will have different solubilities, a leaching constituent may be chosen which dissolves one of the metal oxides, but leaves the other metal oxide intact. The leaching constituent is preferably chosen from the group including acidic solutions of HCl, $HNO_3$, $H_2SO_4$, $H_3PO_4$, and their combinations, or basic solutions of $NH_3$, NaOH, KOH, and their combinations. In a preferred embodiment, the leaching constituent is $NH_3$, ranging from 1M to 10M $NH_3$. In another embodiment, the leaching constituent is HCl of 0.1–1M.

The present invention discloses a technique for preparing a support material having an increased average pore size. In some embodiments, it may be desirable to produce macroporous support materials using the present method. A macropore is herein defined as a pore greater than 100 Angstroms (Å) in diameter. The pore structure can be controlled by changing the aging time of the precursors, the ratio of the metal oxide precursors, the concentration of the leaching constituent, the leaching time, etc.

Catalyst Preparation

The support material of the present invention is preferably for use in an active, or fresh, catalyst. The catalysts of the present invention may be prepared by any of the methods known to those skilled in the art. By way of illustration and not limitation, such methods include impregnating the catalytically active compounds or precursors onto the support material and/or precipitating the catalytically active compounds or precursors onto the support material. Accordingly, the supported catalysts of the present invention may be used in the form of powders, particles, pellets, monoliths, honeycombs, packed beds, foams, aerogels, granules, beads, pills, cylinders, trilobes, extrudates, spheres or other rounded shapes, or another manufactured configurations.

The most preferred method of preparation may vary among those skilled in the art, depending for example on the desired catalyst particle size. Those skilled in the art are able to select the most suitable method for a given set of requirements.

One method of preparing a supported metal catalyst is by incipient wetness impregnation of the support. For higher metal loading, the method may be repeated until desired loading is achieved.

In some embodiments, additional promoters and/or base metals may be used. The prepared catalysts are preferably used in partial oxidation operating conditions.

Step 1: Zirconium Precipitate

150g $ZrO(NO_3)_2 \cdot 2H_2O$ was dissolved into 1200 ml deionized water by heating up the solution for 2 hours at 70° C. The pH value of this solution was gradually adjusted to 7.92 by adding 28–30 wt. % ammonium hydroxide solution. A zirconium compound precipitated while the pH was above 2. During the precipitation, the temperature was controlled at 50±3° C.

Step 2: Aluminum Hydroxide Precipitate 147 g $Al(NO_3)_3 \cdot 9H_2O$ was dissolved into 800 ml deionized water. 28–30 wt. % ammonium hydroxide solution was added to adjust the pH of the aluminum solution to 8, while keeping its temperature at 50±3° C. An aluminum hydroxide compound started to form when pH was increased to above 5.

Step 3: Coprecipitation

The above two precipitates were mixed and agitated for 30 minutes at 50° C. The suspension was filtered and dried at room temperature and subsequently calcined at 700° C. for 5 hours. The resultant sample was named 1A.

Step 4: Acid Washing 11.8 grams of sample 1A was agitated in 300 ml de-ionized water. The pH of the suspension was adjusted to 0.08 by adding a hydrochloride solution and stirring it for 6 hours at 60–70° C. The suspension was filtered and dried at 120° C. overnight. The resultant sample was named 2A.

Step 5: Calcination

A portion of samples 1A and 2A were further calcined at 1100° C. for three hours in air to obtain samples 3B and 3A, respectively.

Catalyst Characterization

TABLE 1

Pore structure and BET surface area of the mixed oxides

| Sample code | Sample description | BET surface area ($m^2/g$) | Average pore diameter, (nm) |
|---|---|---|---|
| 1A | Mixed oxide of alumina and zirconia calcined at 700° C. | 161 | 3.6 |
| 2A | Sample 1A washed with HCl | 169 | 3.8 |
| 3A | Calcined sample 2A at 1100° C. | 11.4 | 13.2 |
| 3B | Calcined sample 1A at 1100° C. | 12 | 10.4 |

As is shown in Table 1, acid washing increased the BET surface area of the mixed oxide support from 161 $m^2/g$ to 169 $m^2/g$ and increased the average pore size from 3.6 nm to 3.8 nm. Although the samples that were calcined at 1100° C. had similar surface areas, the average pore size of the acid-washed sample (3A) is clearly larger (13.2 nm versus 10.4 nm).

Figure 1B:
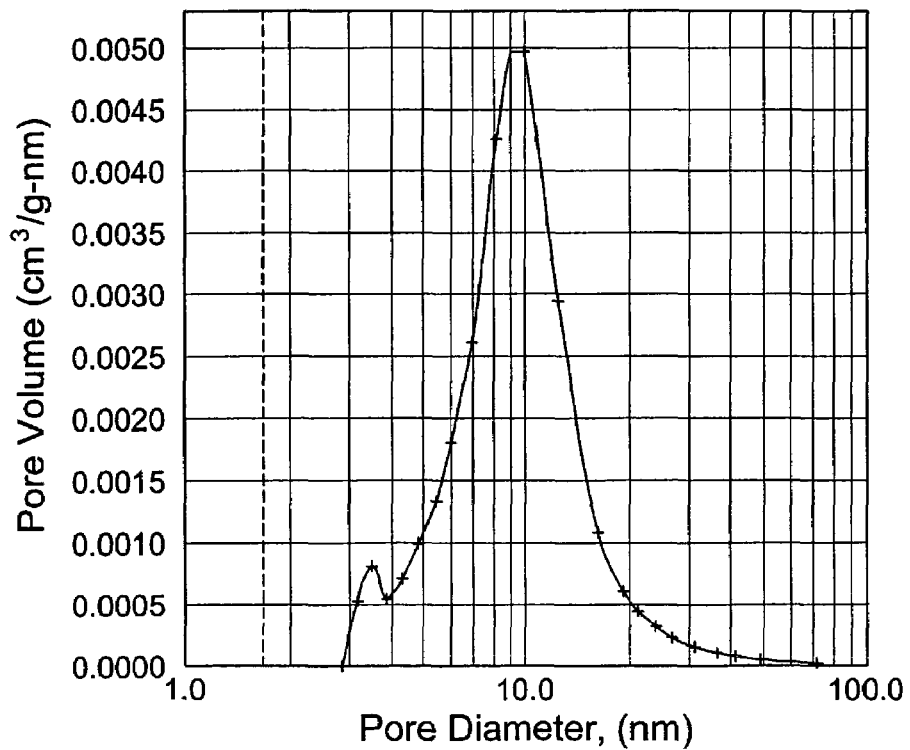
Figure 1C:
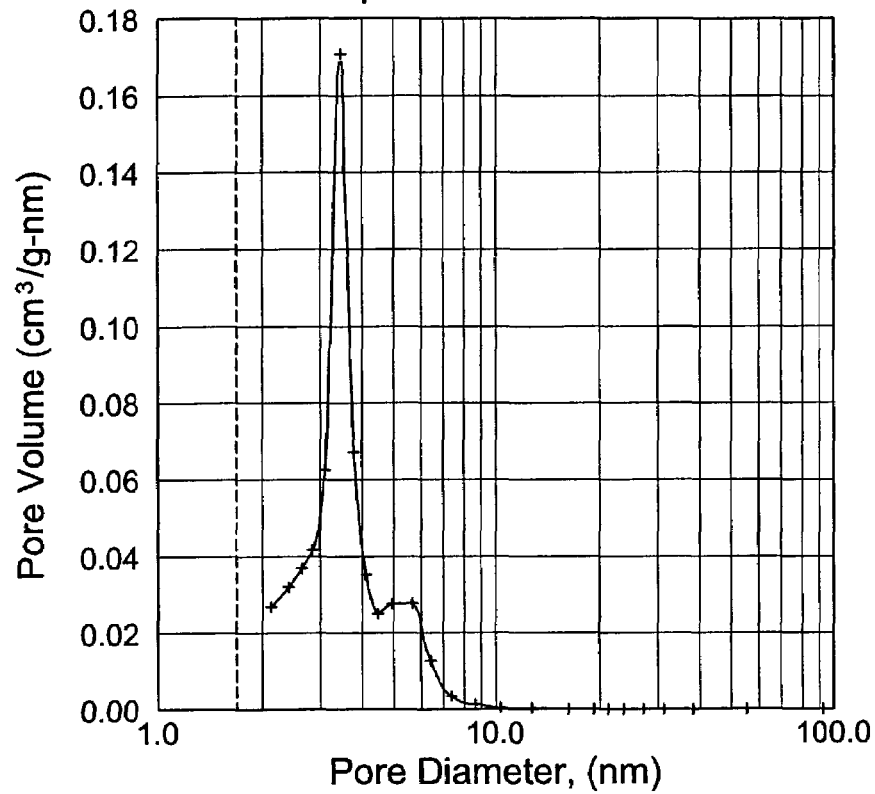
Figure 1D:
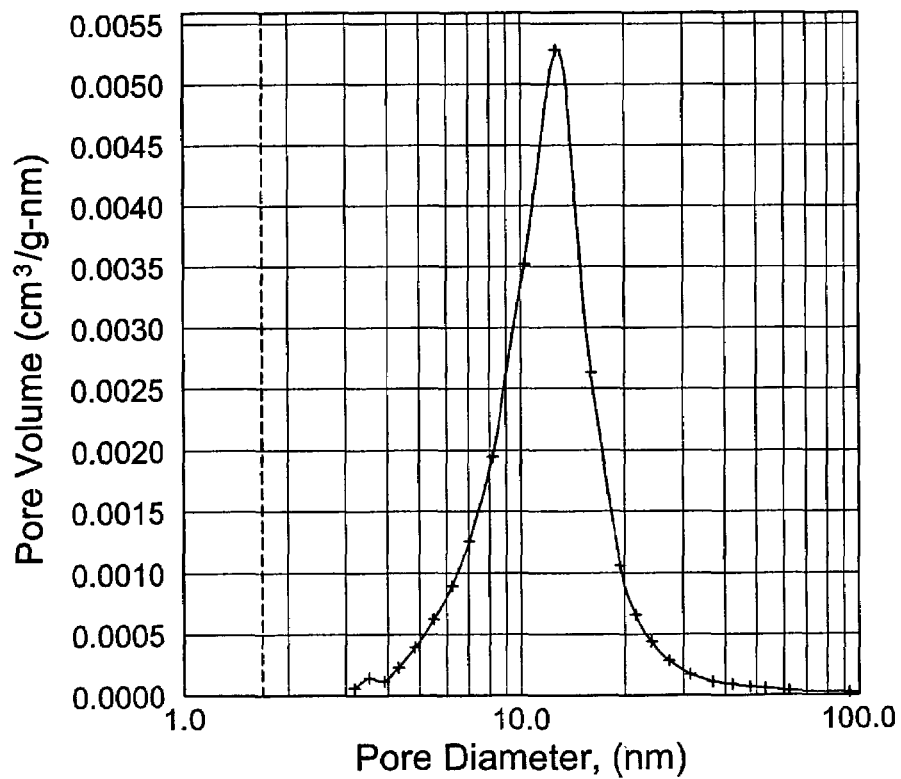

Referring now to FIG. 1, the pore volume distribution data for samples 1A, 2A, 3A and 3B obtained through nitrogen adsorption is shown. Acid-washed samples (calcined at 700° C.) contain larger pores in the diameter range of 5–6 nm than non-acid-washed samples. After calcination at 1100° C., the acid-washed samples have still larger pores (14 nm) than non-acid-washed samples (9–10 nm). From the results, it appears that acid washing and higher calcination temperatures yield the best results.

While the preferred embodiments of the invention have been shown and described, modifications thereof can be made by one skilled in the art without departing from the spirit and teachings of the invention. The embodiments described herein are exemplary only, and are not intended to be limiting. For example, while the invention has been described in a syngas process, it can be translated to any supported catalyst wherein an increased average pore size is desirable. Many variations and modifications of the invention disclosed herein are possible and are within the scope of the invention. Accordingly, the scope of protection is not limited by the description set out above, but is only limited by the claims which follow, that scope including all equivalents of the subject matter of the claims. The disclosures of all patents, patent applications, and publications cited herein are incorporated by reference.

What is claimed is:

1. A method for preparing a porous metaloxide support, the method comprising the steps of:
    a) preparing a mixed metal oxide precursor comprising at least two metals by providing said at least two metals or precursors thereof, and by employing a method selected from the group consisting of precipitation and mechanical mixing;
    b) raising the temperature of the mixed metal oxide precursor at a rate of from 2 to 5 degrees Celsius (° C.) per minute to a calcination temperature in the range of 700° C. to 1300° C. and calcining the mixed metal oxide precursor at the calcination temperature so as to form a calcined mixed metal oxide material; and
    c) leaching the calcined mixed metal oxide material in a leach solution with a leaching constituent that at least partially dissolves one metal oxide so as to produce a porous metal oxide support having a desired average pore size, wherein the leaching constituent is $NH_3$.

2. The method of claim 1 wherein the metals in the mixed metal oxide precursor have different solubilities.

3. The method of claim 2 wherein said at least two metals in said mixed metal oxide precursor are selected from the group consisting of Group IIA, IIIA, VIIIB and rare earth metals.

4. The method of claim 2 wherein the mixed metal oxide material is a mixture of alumina and zirconia.

5. The method of claim 1 wherein the mixed metal oxide precursor is prepared by a mechanical mixing method selected from the group consisting of kneading and milling.

6. The method of claim 1 wherein the mixed metal oxide precursor is prepared by coprecipitation or stepwise precipitation.

7. The method of claim 1 wherein the calcination temperature is in the range of 1100° C. to 1300° C.

8. The method of claim 1 wherein the leaching step occurs in a continuous flowing column or a batch tank.

9. Then method of claim 1 wherein the leaching constituent completely dissolves one metal oxide.

10. The method of claim 1 wherein the leaching constituent further includes a compound selected from the group consisting of acidic solutions and basic solutions, wherein the acidic solutions are solutions of HCl, $HNO_3$, $H_2SO_4$, $H_3PO_3$, and their combinations and the basic solutions are solutions of NaOH, KOH, and their combinations.

11. The method of claim 1 wherein the $NH_3$ concentration ranges from approximately 1M to 10M.

12. The method according to claim 1, further including
    d) applying a catalytically active metal onto the porous metal oxide support by impregnating, precipitating or combinations thereof.

13. The method of claim 1 wherein the supported catalyst is a partial oxidation catalyst.

14. The method of claim 1 wherein said mixed metal oxide material comprises a composite of at least two metal oxides selected from the group consisting of alumina, titania, zirconia and silica.

15. The method of claim 12 wherein the catalytically active metal is selected from the group consisting of Group VIII noble metals.

16. The method of claim 12 wherein the impregnation step is achieved by an incipient wetness technique.

* * * * *